US012784976B2

(12) United States Patent
Yamamoto et al.

(10) Patent No.: US 12,784,976 B2
(45) Date of Patent: Nov. 3, 2026

(54) ELECTRONIC COMPONENT AND MOUNTING METHOD AND MOUNTING STRUCTURE THEREOF

(71) Applicant: Murata Manufacturing Co., Ltd., Nagaokakyo (JP)

(72) Inventors: Chiaki Yamamoto, Nagaokakyo (JP); Yasushi Yoshida, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 126 days.

(21) Appl. No.: 18/598,294

(22) Filed: Mar. 7, 2024

(65) Prior Publication Data

US 2024/0212929 A1 Jun. 27, 2024

Related U.S. Application Data

(63) Continuation of application No. PCT/JP2022/033469, filed on Sep. 6, 2022.

(30) Foreign Application Priority Data

Sep. 8, 2021 (JP) ................................ 2021-145860

(51) Int. Cl.
*H01G 4/30* (2006.01)
*H01G 2/06* (2006.01)
(Continued)

(52) U.S. Cl.
CPC ............. *H01G 4/008* (2013.01); *H01G 2/065* (2013.01); *H01G 4/012* (2013.01); *H01G 4/232* (2013.01); *H01G 4/30* (2013.01)

(58) Field of Classification Search
CPC ........ H01G 4/008; H01G 2/065; H01G 4/012; H01G 4/232; H01G 4/30; H01G 4/12;
(Continued)

(56) References Cited

U.S. PATENT DOCUMENTS

2009/0053553 A1* 2/2009 Masago .................. B32B 15/01
428/647
2009/0323253 A1 12/2009 Kobayashi et al.
(Continued)

FOREIGN PATENT DOCUMENTS

JP 2006269829 A 10/2006
JP 2009141292 A 6/2009
(Continued)

OTHER PUBLICATIONS

English Machine Translation of JP2011109065 (Year: 2011).*
(Continued)

*Primary Examiner* — Timothy J. Dole
*Assistant Examiner* — Esther N Lian
(74) *Attorney, Agent, or Firm* — Keating & Bennett, LLP

(57) ABSTRACT

An electronic component includes a base body including internal electrodes embedded therein, first and second main surfaces opposed to each other in a thickness direction, first and second lateral surfaces opposed to each other in a width direction, and first and second end surfaces opposed to each other in a length direction, and a pair of external electrodes respectively on the first and second end surfaces of the base body and respectively connected to the internal electrodes. The external electrodes include at least a Ni plated layer and a $Cu_6Sn_5$ portion provided directly on the Ni plated layer or indirectly on the Ni plated layer via a Cu intervening portion with an island shape or a layered structure.

17 Claims, 7 Drawing Sheets

(51) Int. Cl.
*H01G 4/008* (2006.01)
*H01G 4/012* (2006.01)
*H01G 4/232* (2006.01)

(58) Field of Classification Search
CPC ...... H01G 4/228; H01G 4/2325; H01G 4/252; H01G 4/1209; H01G 13/006; H01F 27/29; Y02E 60/13
See application file for complete search history.

(56) References Cited

U.S. PATENT DOCUMENTS

| | | | | |
|---|---|---|---|---|
| 2011/0051314 | A1* | 3/2011 | Sakurai | B23K 1/0016 361/321.1 |
| 2017/0032896 | A1* | 2/2017 | Otani | H01G 4/30 |
| 2018/0166215 | A1* | 6/2018 | Hamanaka | H01G 4/12 |
| 2020/0118754 | A1 | 4/2020 | Seo | |
| 2020/0176189 | A1* | 6/2020 | Koo | H01G 4/2325 |
| 2021/0074481 | A1 | 3/2021 | Yi et al. | |
| 2022/0165500 | A1* | 5/2022 | Lee | H01G 4/2325 |

FOREIGN PATENT DOCUMENTS

| | | | | |
|---|---|---|---|---|
| JP | 2010034503 | A | | 2/2010 |
| JP | 2011109065 | A | * | 6/2011 |
| JP | 2020061537 | A | | 4/2020 |
| KR | 20190116168 | A | | 10/2019 |

OTHER PUBLICATIONS

International Search Report in PCT/JP2022/033469, mailed Nov. 29, 2022, 3 pages.
Written Opinion in PCT/JP2022/033469, mailed Nov. 29, 2022, 4 pages.

* cited by examiner

ELECTRONIC COMPONENT AND MOUNTING METHOD AND MOUNTING STRUCTURE THEREOF

CROSS REFERENCE TO RELATED APPLICATIONS

This application claims the benefit of priority to Japanese Patent Application No. 2021-145860 filed on Sep. 8, 2021 and is a Continuation Application of PCT Application No. PCT/JP2022/033469 filed on Sep. 6, 2022. The entire contents of each application are hereby incorporated herein by reference.

BACKGROUND OF THE INVENTION

1. Field of the Invention

The present invention relates to an electronic component and a mounting method and a mounting structure thereof.

2. Description of the Related Art

With the miniaturization of electronic devices such as mobile phones and increasing speeds of CPUs, demands for multilayer ceramic capacitors (MLCC) are increasing.

As such multilayer ceramic capacitors, for example, Japanese Unexamined Patent Application Publication No. 2020-61537 discloses a multilayer ceramic electronic component which includes a ceramic body including dielectric layers and first and second internal electrodes stacked so as to be alternately exposed to the first and second outsides across the dielectric layers, and first and second external electrodes provided on the first and second outsides of the ceramic body so as to be connected to corresponding internal electrodes among the first and second internal electrodes, respectively, in which each of the first and second external electrodes includes first and second base electrode layers in contact with the first and second outer sides of the ceramic body, first and second nickel plated layers that cover the first and second base electrode layers, respectively, and first and second tin plated layers that cover the first and second nickel plated layers, respectively, and the center portion of each of the first and second tin plated layers has a thickness of greater than 5 μm.

SUMMARY OF THE INVENTION

In multilayer ceramic electronic components in each of which copper is contained in the (first and second) base electrode layers among the external electrodes, copper contained in the base electrode layers is likely to diffuse into the tin plated layer, and copper disappears from the base electrode layers at the time of joining to the land of the circuit board, such that mounting failure may occur. In this respect, in each of the multilayer ceramic electronic components of Japanese Unexamined Patent Application Publication No. 2020-61537, providing a nickel plated layer to cover the base electrode layer causes diffusion of copper from the base electrode layer to hardly occur.

However, even when a nickel plated layer is provided to cover the base electrode layer, in the reflow step of heating the solder on the circuit board to join the electronic components to the circuit board, when the joining temperature becomes high or exposure to a high temperature environment is lengthened, mounting defects may occur due to diffusion of nickel atoms contained in the nickel plated layer into the solder. Therefore, the multilayer ceramic electronic components described in Japanese Unexamined Patent Application Publication No. 2020-61537 still have room for improvement in heat resistance of the external electrode.

Example embodiments of the present invention provide electronic components each including external electrodes having excellent heat resistance and effective reduction or prevention of whisker generation due to thermal shock, and a mounting method and a mounting structure thereof.

According to an example embodiment of the present invention, an electronic component includes a base body including internal electrodes embedded therein, first and second main surfaces opposed to each other in a thickness direction, first and second lateral surfaces opposed to each other in a width direction orthogonal or substantially orthogonal to the thickness direction, and first and second end surfaces opposed to each other in a length direction orthogonal or substantially orthogonal to both the thickness direction and the width direction, and a pair of external electrodes respectively on the first and second end surfaces of the base body and respectively connected to the internal electrodes, in which the pair of external electrodes each include at least a Ni plated layer, and a $Cu_6Sn_5$ portion provided directly on the Ni plated layer or indirectly on the Ni plated layer via a Cu intervening portion with an island shape or a layered structure.

According to the example embodiments of the present invention, it is possible to provide electronic components each including external electrodes having excellent heat resistance and effective reduction or prevention of whisker generation due to thermal shock, and mounting methods and mounting structures thereof.

The above and other elements, features, steps, characteristics and advantages of the present invention will become more apparent from the following detailed description of the example embodiments with reference to the attached drawings.

BRIEF DESCRIPTION OF THE DRAWINGS

FIG. 4A is a partial cross-sectional view of an external electrode when a $Cu_6Sn_5$ portion is on a Ni plated layer via a Cu intervening portion in an island shape, FIG. 4B is a partial cross-sectional view of an external electrode when a $Cu_6Sn_5$ portion is on a Ni plated layer via a Cu intervening portion in a layered structure, and FIG. 4C is a partial cross-sectional view of an external electrode when a $Cu_6Sn_5$ portion is provided directly on a Ni plated layer.

FIG. 5A is a partial cross-sectional view of an external electrode when a Cu intervening portion in an island shape is provided by a single intervening portion including a $Cu_3Sn$ portion in an island shape, and FIG. 5B is a partial cross-sectional view of an external electrode when a layer-shaped Cu intervening portion is provided by a single intervening portion including a layer-shaped $Cu_3Sn$ portion.

FIG. 6A is a partial cross-sectional view of an external electrode when a Cu intervening portion in an island shape is provided by a composite intervening portion including a Cu portion in an island shape and a $Cu_3Sn$ portion in an island shape, FIG. 6B is a partial cross-sectional view of an external electrode when a Cu intervening portion in a layered structure is provided by a composite intervening portion including a Cu portion in an island shape and a $Cu_3Sn$ portion in a layered structure, and FIG. 6C is a partial cross-sectional view of an external electrode when a Cu intervening portion in a layered structure is provided by a composite intervening portion including a Cu portion in a layered structure and a $Cu_3Sn$ portion in a layered structure.

FIGS. 7A and 7B are each a schematic cross-sectional view showing a method of mounting each of the electronic components of the present example embodiment, in which FIG. 7A is a schematic cross-sectional view showing a state before reflow in which an electronic component is mounted on a land of a circuit board via solder, and FIG. 7B is a schematic cross-sectional view showing a state after reflow in which the electronic component is mounted on the circuit board.

DETAILED DESCRIPTION OF THE EXAMPLE EMBODIMENTS

Hereinafter, example embodiments of the present invention (hereinafter, referred to as "the present example embodiment") will be described with reference to the drawings. The present invention is not limited to the example embodiments described hereinafter, and various modifications can be made without departing from the gist of the present invention.

(1) Electronic Components

Hereinafter, electronic components according to an example embodiment of the present invention will be described with reference to the drawings. In the present example embodiment, a multilayer ceramic capacitor will be described as an example of an electronic component. A normal two-terminal capacitor will be described as an example in the present example embodiment. However, the present invention is not limited thereto. Example embodiments of the present invention can be applied not only to a multilayer ceramic capacitor, but also to a multilayer LC filter including a coil and a capacitance, a multilayer ceramic inductor, and a multilayer ceramic thermistor. Example embodiments of the present invention can be applied further to electrodes connected to various external electronic components such as a coil around which an electrically conductive wire is wound, and a module in which an electronic component is embedded in a resin.

Figure 1:
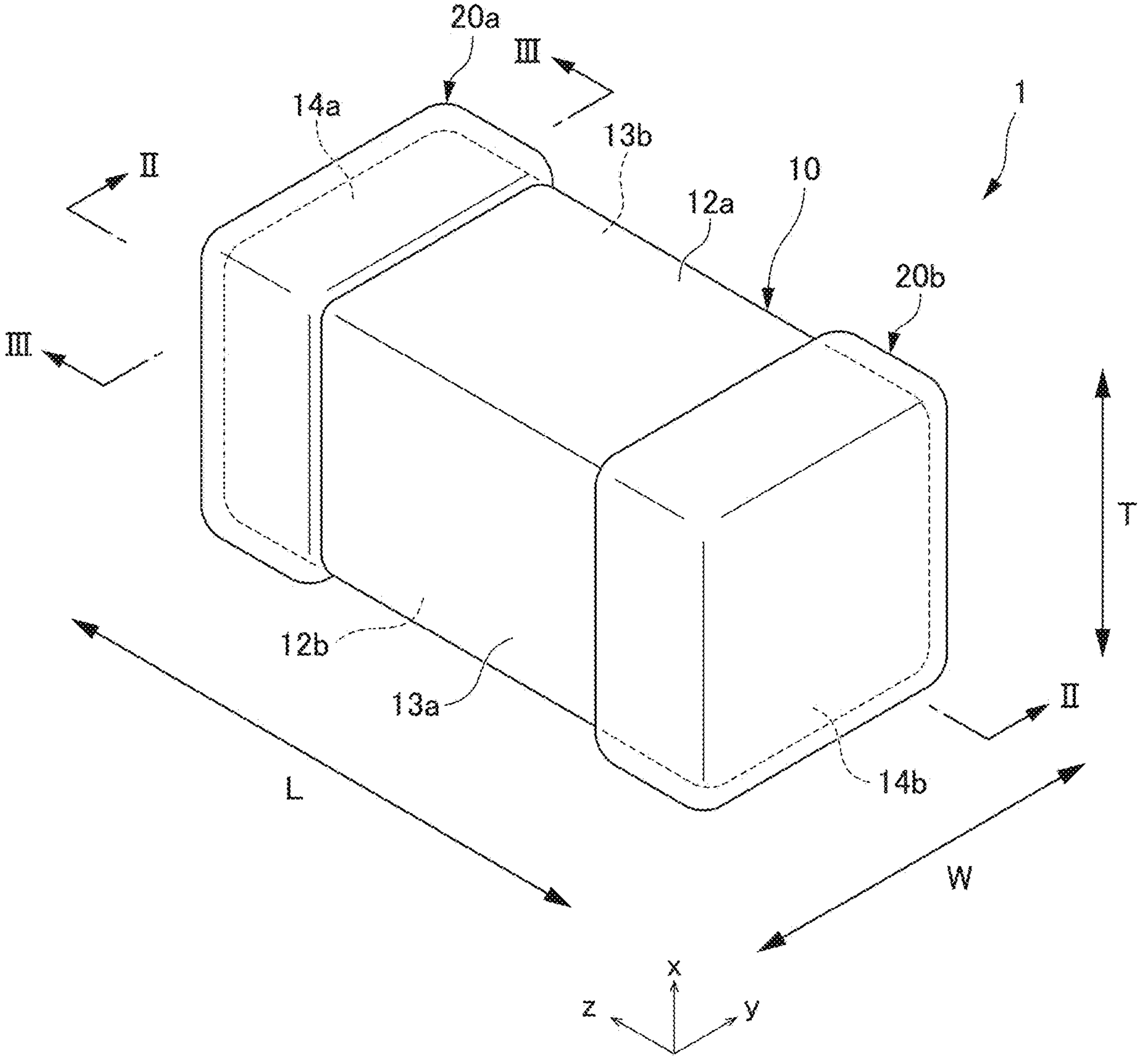
FIG. 1 is an external perspective view of an example of a multilayer ceramic capacitor serving as an example of an electronic component.
Figure 2:
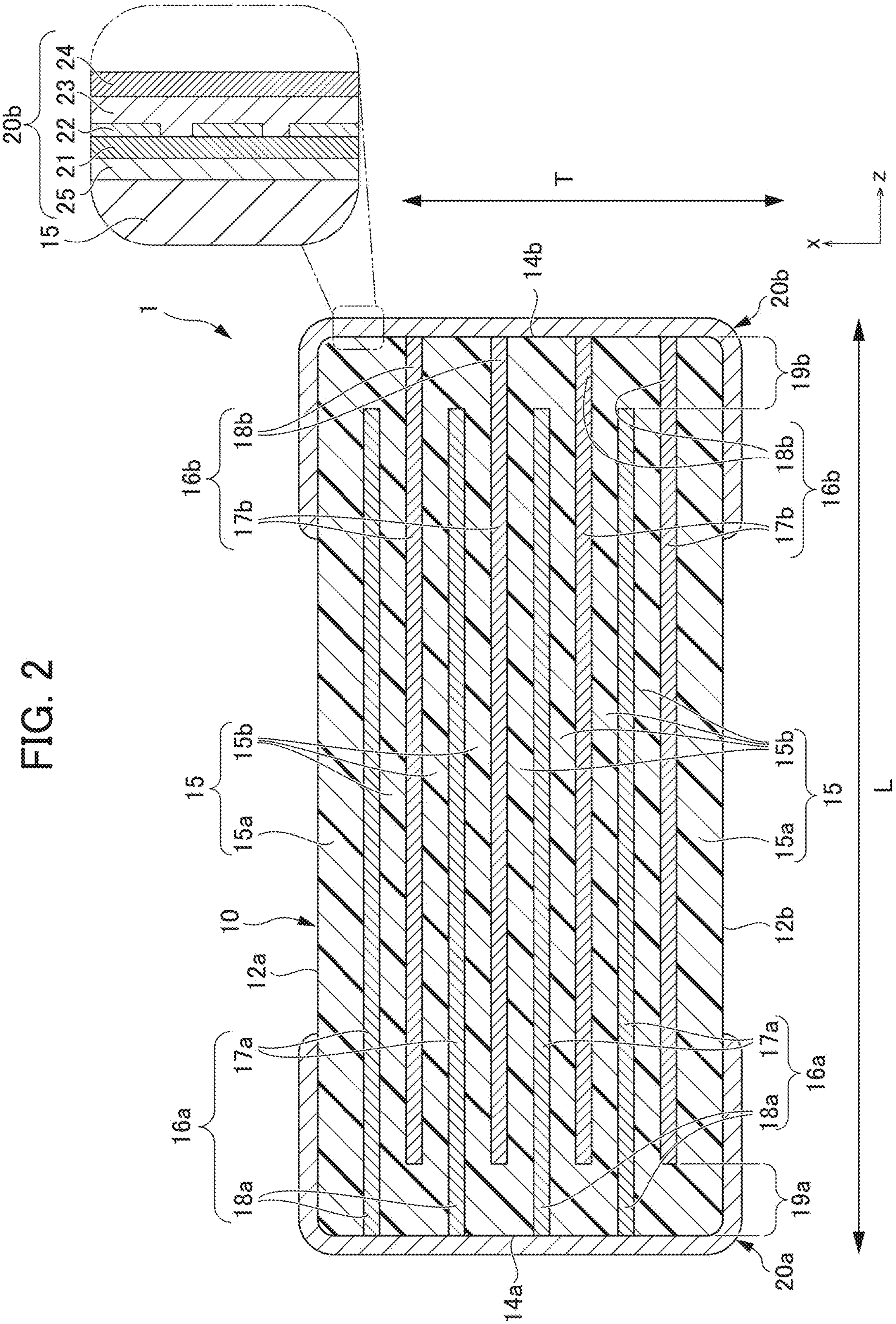
FIG. 2 is a cross-sectional view of a plane including a length direction L and a thickness direction T, taken along the line II-II shown in FIG. 1.
Figure 3:
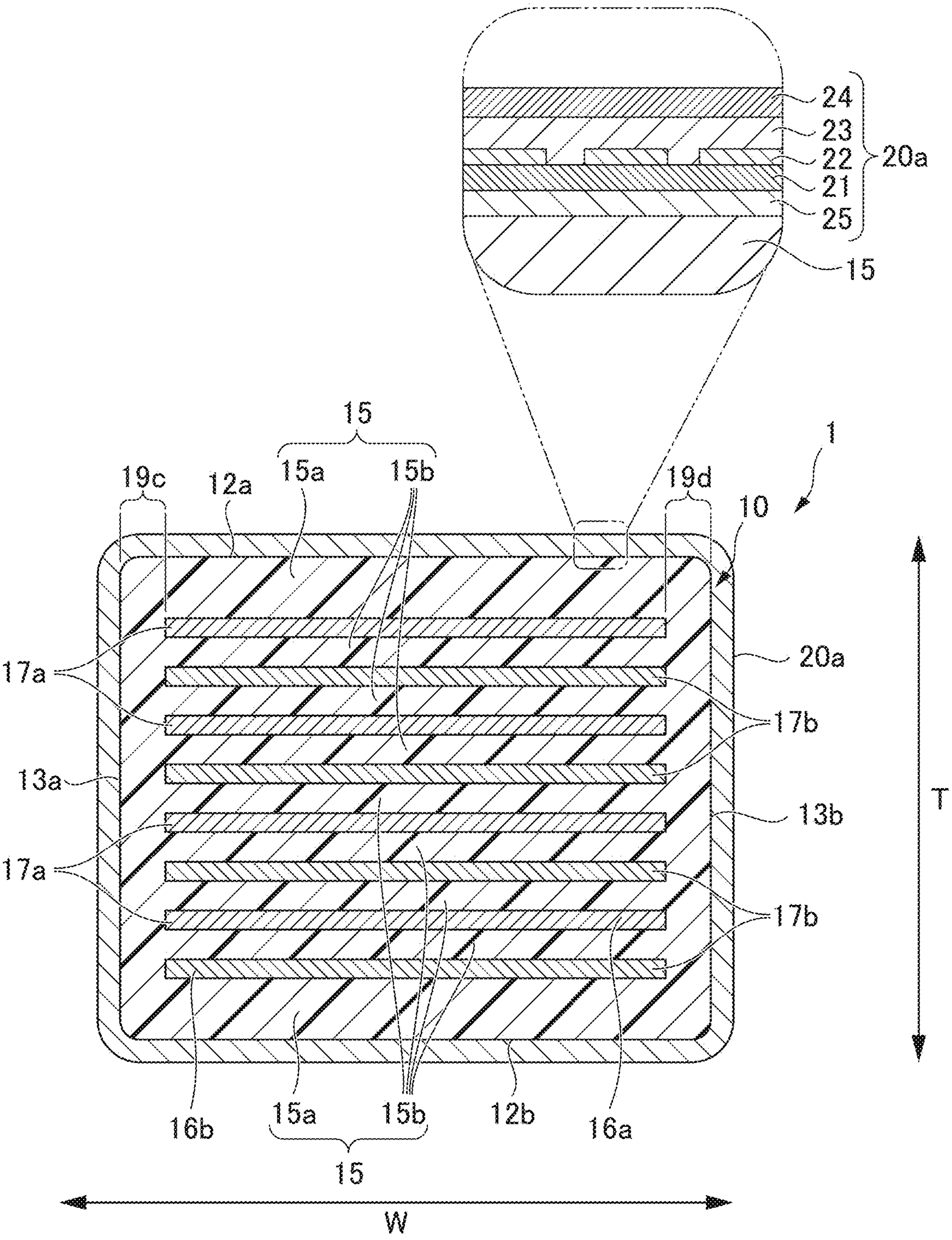
FIG. 3 is a cross-sectional view of a plane including a width direction W and a thickness direction T, taken along the line III-III shown in FIG. 1.

FIG. 1 is an external perspective view of an example of a multilayer ceramic capacitor serving as an example of an electronic component. FIG. 2 is a cross-sectional view of a plane including a length direction L and a thickness direction T, taken along the line II-II shown in FIG. 1. FIG. 3 is a cross-sectional view of a plane including a width direction W and the thickness direction T at a position taken along the line III-III shown in FIG. 1.

The electronic component 1 of the present example embodiment includes a base body 10 including internal electrodes 16*a* and 16*b* embedded therein, first and second main surfaces 12*a* and 12*b* opposed to each other in the thickness direction T, first and second lateral surfaces 13*a* and 13*b* opposed to each other in the width direction W orthogonal or substantially orthogonal to the thickness direction T, and first and second end surfaces 14*a* and 14*b* opposed to each other in the length direction L orthogonal or substantially orthogonal to both the thickness direction T and the width direction W, and a pair of external electrodes 20*a* and 20*b* respectively on the first and second end surfaces 14*a* and 14*b* of the base body 10 and respectively connected to the internal electrodes 16*a* and 16*b*. Here, the external electrodes 20*a* and 20*b* include at least a Ni plated layer 21 and a $Cu_6Sn_5$ portion 23 provided directly on the Ni plated layer 21 or indirectly on the Ni plated layer 21 via a Cu intervening portion 22 with an island shape or a layered structure.

Examples of the multilayer ceramic capacitor serving as the electronic component 1 of the present example embodiment include, as shown in FIG. 1, a component including the base body having a rectangular or substantially rectangular parallelepiped shape and the two external electrodes 20*a* and 20*b* provided at least on both end surfaces 14*a* and 14*b* of the base body 10. The base body 10 may have a well-known structure, and is not limited to the rectangular or substantially rectangular parallelepiped structure shown in FIG. 1.

The base body 10 includes a plurality of ceramic layers 15 and the plurality of internal electrode layers 16*a* and 16*b* which are laminated therein. Further, the base body 10 includes a first main surface 12*a* and a second main surface 12*b* opposed to each other in the thickness direction T, a first lateral surface 13*a* and a second lateral surface 13*b* opposed to each other in the width direction W orthogonal or substantially orthogonal to the thickness direction T, and a first end surface 14*a* and a second end surface 14*b* opposed to each other in the length direction L orthogonal or substantially orthogonal to the thickness direction T and the width direction W. The dimensions of the base body 10 are not particularly limited. As shown in FIG. 1, the dimension of the base body 10 along the length direction L is not necessarily longer than the dimension along the width direction W.

The base body 10 is preferably rounded at corner portions and ridge portions of a rectangular parallelepiped. Here, the corner portion means a portion where three adjacent surfaces of the base body 10 intersect, and the ridge portion means a portion where two adjacent surfaces of the base body 10 intersect. Further, unevenness or the like may be provided in a portion or all of the first main surface 12*a* and the second main surface 12*b*, the first lateral surface 13*a* and the second lateral surface 13*b*, and the first end surface 14*a* and the second end surface 14*b*.

As shown in FIG. 2, the base body 10 include a structure in which internal electrodes 16*a* and 16*b* are embedded in the ceramic layers 15. Here, the ceramic layers 15 in which the internal electrodes 16*a* and 16*b* are embedded include outer layer portions 15*a* and inner layer portions 15*b*. One of the outer layer portions 15*a* includes the first main surface 12*a* of the base body 10, and includes the ceramic layer located on the outer side of the internal electrode layer (the internal electrode layer 16*a* in FIG. 2) closest to the first main surface 12*a*. The other of the outer layer portions 15*a* includes the second main surface 12*b* of the base body 10, and the ceramic layer located on the outer side of the internal electrode layer (the internal electrode layer 16*b* in FIG. 2) closest to the second main surface 12*b*. Further, each of the inner layer portions 15*b* is a ceramic layer partitioned by two adjacent internal electrode layers 16*a* and 16*b* opposed to each other. The thickness of the ceramic layer of the outer layer portion 15*a* is not particularly limited, but is preferably thicker than the ceramic layer of each of the inner layer portions 15*b*, and may be, for example, about 20 μm or more and about 300 μm or less.

The total number of the ceramic layers laminated in the base body 10 (including ceramic layers laminated in the inner layer portion 15*b* and the two outer layer portions 15*a*) is not particularly limited, but is preferably 15 pieces or more and 2000 pieces or less.

The outer dimension of the base body 10 is not particularly limited, but it is preferable that the dimension along the length direction L is about 0.08 mm or more and about 5.6 mm or less, the dimension along the width direction W is about 0.04 mm or more and about 4.9 mm or less, and the dimension along the thickness direction T is about 0.04 mm or more and about 2.9 mm or less, for example.

In a case in which each of the electronic components 1 is a multilayer ceramic capacitor, the ceramic layer 15 included in the base body 10 is preferably made of a dielectric material. Here, as the dielectric material, for example, a dielectric ceramic including a main component such as $BaTiO_3$, $CaTiO_3$, $SrTiO_3$, or $CaZrO_3$ can be used. In a case in which the dielectric material is contained as a main component, depending on the desired characteristics of the base body 10, for example, a subcomponent having a content smaller than that of the main component such as a Mn compound, an Fe compound, a Cr compound, a Co compound, or a Ni compound may be added.

Further, in a case in which each of the electronic components 1 is a thermistor element, the ceramic layer 15 included in the base body 10 is preferably made of semiconductor ceramic. Here, as the semiconductor ceramic material, for example, a spinel ceramic material can be used.

Further, in a case in which each of the electronic components 1 is an inductor element, the ceramic layer 15 included in the base body 10 is preferably made of magnetic ceramic. Here, as the magnetic ceramic material, for example, a ferrite ceramic material can be used. In this case, the internal electrodes 16*a* and 16*b* of the base body 10 are preferably made of a conductor having a coiled shape.

The thickness of each of the ceramic layers 15 included in the base body 10 is not particularly limited, but is preferably about 0.4 μm or more and about 20 μm or less, for example.

In the base body 10 shown in FIGS. 1 to 3, the plurality of first internal electrode layers 16*a* and the plurality of second internal electrode layers 16*b* each having, for example, a substantially rectangular planar shape are embedded as the internal electrode layers 16. The first internal electrode layers 16*a* and the second internal electrode layers 16*b* are preferably embedded such that they are provided alternately at equal intervals across the ceramic layers 15 in the thickness direction T of the base body 10.

Here, as shown in FIG. 2, each of the first internal electrode layers 16*a* includes a first counter electrode portion 17*a* opposed to the second internal electrode layer 16*b*, and a first extension electrode portion 18*a* that defines and functions as one end of each of the first internal electrode layers 16*a*, is adjacent to the first end surface 14*a* of the base body 10, and extends from the first counter electrode portion 17*a* to the first end surface 14*a* of the base body 10. The end portion of each of the first extension electrode portions 18*a* is exposed at the first end surface 14*a*, and is connected to the first external electrode 20*a* described later.

Further, each of the second internal electrode layers 16*b* includes a second counter electrode portion 17*b* opposed to the first internal electrode layer 16*a*, and a second extension electrode portion 18*b* that defines and functions as one end (the other end) of each of the second internal electrode layers 16*b*, is adjacent to the second end surface 14*b* of the base body 10, and extends from the second counter electrode portion 17*b* to the second end surface 14*b* of the base body 10. The end portion of each of the second extension electrode portions 18*b* is exposed at the second end surface 14*b*, and is connected to the second external electrode 20*b* described later.

In the base body 10, as shown in FIG. 2, it is preferable that an end portion of the first internal electrode layer 16*a* opposite to the first extension electrode portion 18*a* is separated from the second end surface 14*b* by the ceramic layer 15, and also an end portion of the second internal electrode layer 16*b* opposite to the second extension electrode portion 18*b* is separated from the first end surface 14*a* by the ceramic layer 15 (the separated portions 19*a* and 19*b* of each of the ceramic layers are hereinafter referred to as "L gap"). Further, as shown in FIG. 3, in the base body 10, it is preferable that one end in the width direction of the first counter electrode portion 17*a* and one end in the width direction of the second counter electrode portion 17*b* are separated from the first lateral surface 13*a* by the ceramic layer 15, and the other end in the width direction of the first counter electrode portion 17*a* and the other end in the width direction of the second counter electrode portion 17*b* are separated from the second lateral surface 13*b* by the ceramic layer 15 (the separated portions 19*c* and 19*d* are hereinafter referred to as "W gaps").

Each of the internal electrode layers 16 may be made of an appropriate conductive material such as a metal such as Ni, Cu, Ag, Pd, or Au, or an alloy including at least one of these metals such as an Ag—Pd alloy. Each of the internal electrode layers 16 may further include dielectric particles having the same composition as the ceramics contained in the ceramic layer 15.

The thickness of each of the internal electrode layers 16 is not particularly limited, but is preferably about 0.3 μm or more and about 2.0 μm or less, for example. Further, the total number of the internal electrode layers 16*a* and 16*b* is preferably equal or substantially equal to the total number of the ceramic layers, and more specifically, it is preferably in the range of 15 pieces or more and 2000 pieces or less.

As shown in FIGS. 1 and 2, each of the external electrodes is on the first end surface 14*a* and the second end surface 14*b* of the base body 10, respectively. Here, the external electrodes include a pair of the first external electrode 20*a* and the second external electrode 20*b*. The first external electrode 20*a* is electrically connected to the first internal electrode layers 16*a*, and the second external electrode 20*b* is electrically connected to the second internal electrode layers 16*b*.

More specifically, the first external electrode 20*a* is provided at least on the surface of the first end surface 14*a* of the base body 10. In the example embodiment shown in FIG. 1, the first external electrode 20*a* is not only on the surface of the first end surface 14*a*, but also extends from the first end surface 14*a* to cover a portion of each of the first main surface 12*a*, the second main surface 12*b*, the first lateral surface 13*a*, and the second lateral surface 13*b*. In this case, the first external electrode 20*a* is electrically connected to each of the first extension electrode portions 18*a* of the first internal electrode layer 16*a*.

Further, the second external electrode 20*b* is provided at least on the surface of the second end surface 14*b* of the base body 10. In the example embodiment shown in FIG. 1, the second external electrode 20*b* is not only on the surface of the second end surface 14*b*, but also extends from the second end surface 14*b* to cover a portion of each of the first main surface 12*a*, the second main surface 12*b*, the first lateral surface 13*a*, and the second lateral surface 13*b*. In this case, the second external electrode 20*b* is electrically connected to each of the second extension electrode portions 18*b* of the second internal electrode layer 16*b*.

In the base body 10, each of the first counter electrode portions 17*a* of the first internal electrode layers 16*a* and each of the second counter electrode portions 17*b* of the second internal electrode layers 16*b* are opposed to each other with a respective one of the ceramic layers 15 interposed therebetween, such that capacitance is provided. Therefore, capacitance can be obtained between the first external electrode 20*a* to which each of the first internal electrode layers 16*a* is connected and the second external electrode 20*b* to which each of the second internal electrode layers 16*b* is connected, such that characteristics of the capacitor are developed.

One or both of the first external electrode 20*a* and the second external electrode 20*b* include at least the Ni plated layer 21 and the $Cu_6Sn_5$ portion 23 provided directly on the Ni plated layer 21 or indirectly via the Cu intervening portion 22 with an island shape or a layered structure. Here, the Ni plated layer 21 is preferably on the surface of the base body 10 with a base electrode layer 25 interposed therebetween. The Sn plated layer 24 is preferably on the surface of the $Cu_6Sn_5$ portion 23.

Figure 4A:
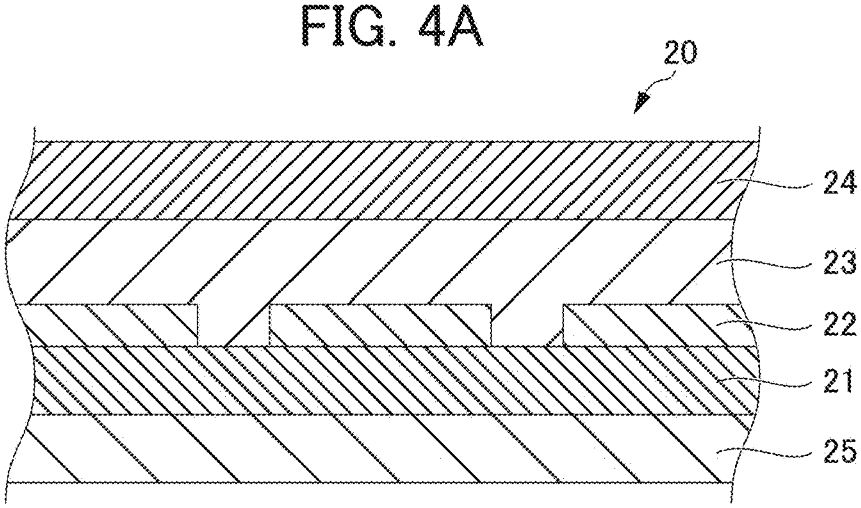
FIGS. 4A to 4C are partial cross-sectional views of various external electrodes with different laminated structures, where
Figure 4B:
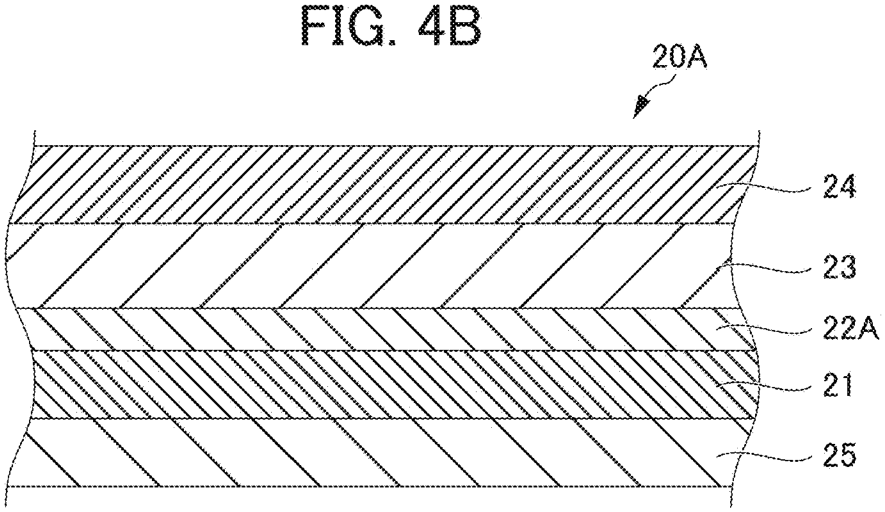
Figure 4C:
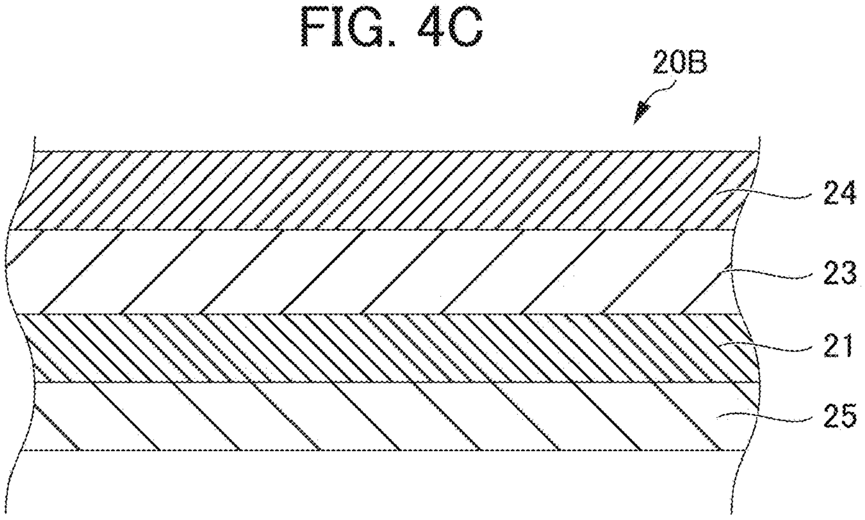

That is, in the electronic component of the present example embodiment, for example, as shown in FIG. 4A, each of the external electrodes 20 can be provided in such a manner that the Ni plated layer 21 is on the base electrode layer 25, the $Cu_6Sn_5$ portion 23 is on the Ni plated layer 21 via the Cu intervening portion 22 with an island shape, and the Sn plated layer 24 is on the $Cu_6Sn_5$ portion 23. Further, in the electronic component of the present example embodiment, as shown in FIG. 4B, the external electrode 20A may be provided in such a manner that the Ni plated layer 21 is on the base electrode layer 25, the $Cu_6Sn_5$ portion 23 is indirectly on the Ni plated layer 21 via the Cu intervening portion 22A with a layered structure, and the Sn plated layer 24 is on the $Cu_6Sn_5$ portion 23. Further, in the electronic component of the present example embodiment, as shown in FIG. 4C, the external electrode 20B may be provided in such a manner that the Ni plated layer 21 is on the base electrode layer 25, the $Cu_6Sn_5$ portion 23 is directly on the Ni plated layer 21, and the Sn plated layer 24 is on the $Cu_6Sn_5$ portion 23.

The base electrode layer 25 of the external electrode 20 has electrical conductivity and covers the first end surface 14*a* or the second end surface 14*b* of the base body 10. Here, it is preferable that the base electrode layer 25 is on the first end surface 14*a* or the second end surface 14*b* of the base body 10, and extends from the first end surface 14*a* or the second end surface 14*b* to cover a portion of each of the first main surface 12*a*, the second main surface 12*b*, the first lateral surface 13*a*, and the second lateral surface 13*b*.

Examples of the base electrode layer 25 include a layer including electrically conductive metal and glass. Examples of the electrically conductive metal included in the base electrode layer 25 include a metal such as Cu, Ni, Ag, Pb and Au, and an alloy such as a Ag—Pb alloy. Further, examples of the glass included in the base electrode layer 25 include a glass including one or more components selected from B, Si, Pd, Ba, Mg, Al, and Li, for example. The base electrode layer 25 may include a plurality of layers. The base electrode layer 25 may be provided by applying an electrically conductive paste including a glass and an electrically conductive metal to the base body 10 and firing the resulting product. More specifically, the base electrode layer 25 may be fired at the same time as the ceramic layer 15 and the internal electrode layer 16, or may be fired after firing the ceramic layer 15 and the internal electrode layer 16. The thickest portion of the base electrode layer 25 preferably has the thickness of about 10 μm or more and about 150 μm or less, for example.

The Ni plated layer 21 is on the end surface of the base body 10 directly or with the base electrode layer 25 interposed therebetween. It is more preferable that the Ni plated layer 21 is on the surface of the base electrode layer 25 which is on the first end surface 14*a* or the second end surface 14*b* of the base body 10 and extends from the first end surface 14*a* or the second end surface 14*b* to reach the first main surface 12*a*, the second main surface 12*b*, the first lateral surface 13*a*, and the second lateral surface 13*b*.

With such a configuration in which the Ni plated layer 21 is on the external electrode 20, it is possible to prevent each of the internal electrode layers 16 and the base electrode layer 25 from being eroded by the solder used in the reflow process when the electronic component 1 is mounted on the circuit board.

The thickness of the Ni plated layer 21 is not particularly limited, but is preferably about 1 μm or more and about 15 μm or less, for example.

The Cu intervening portion 22 is provided on the surface of the Ni plated layer 21 in various manners. Here, it is preferable that the Cu intervening portion 22 is a single intervening portion including a $Cu_3Sn$ portion 26 with an island shape or a layered structure on the Ni plated layer 21, or a composite intervening portion in which a Cu portion 27 including Cu with an island shape or a layered structure and the $Cu_3Sn$ portion 26 including $Cu_3Sn$ with the island shape or the layered structure are sequentially provided on the Ni plated layer 21.

Figure 5A:
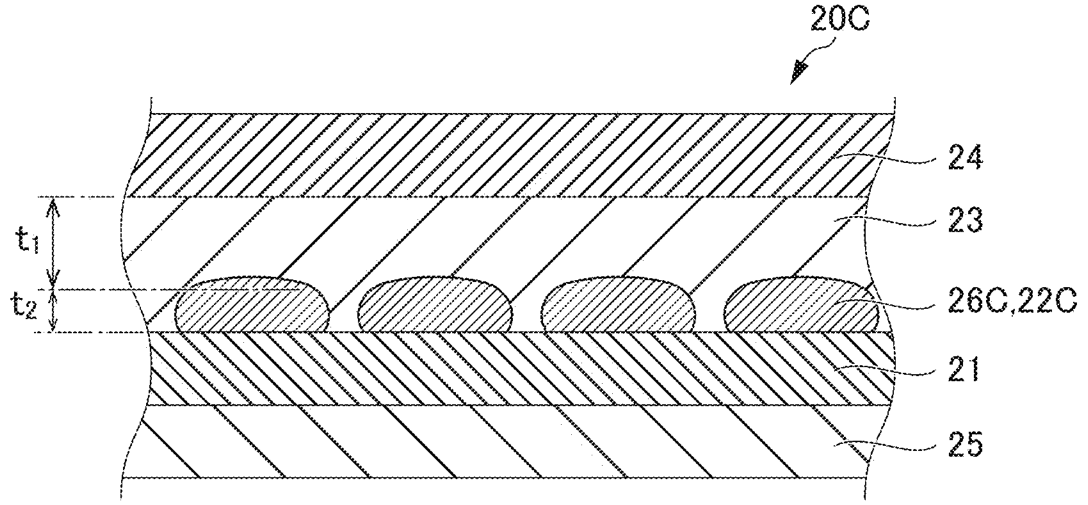
FIGS. 5A and 5B are each a partial cross-sectional view of a laminated structure of an external electrode when a Cu intervening portion is a single intervening portion, where
Figure 5B:
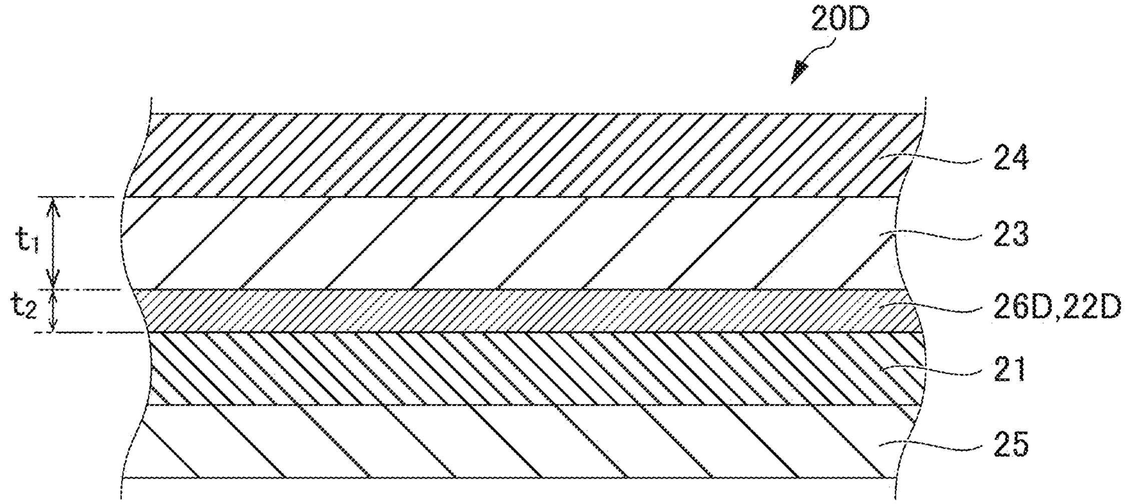

That is, the Cu intervening portion may be a single intervening portion including a $Cu_3Sn$ portion 26C with an island shape on the Ni plated layer 21. FIG. 5A shows such a single intervening portion as the Cu intervening portion 22C. Further, the Cu intervening portion may be a single intervening portion including a $Cu_3Sn$ portion 26D in a layered structure on the Ni plated layer 21. FIG. 5B shows such a single intervening portion as the Cu intervening portion 22D.

Figure 6A:
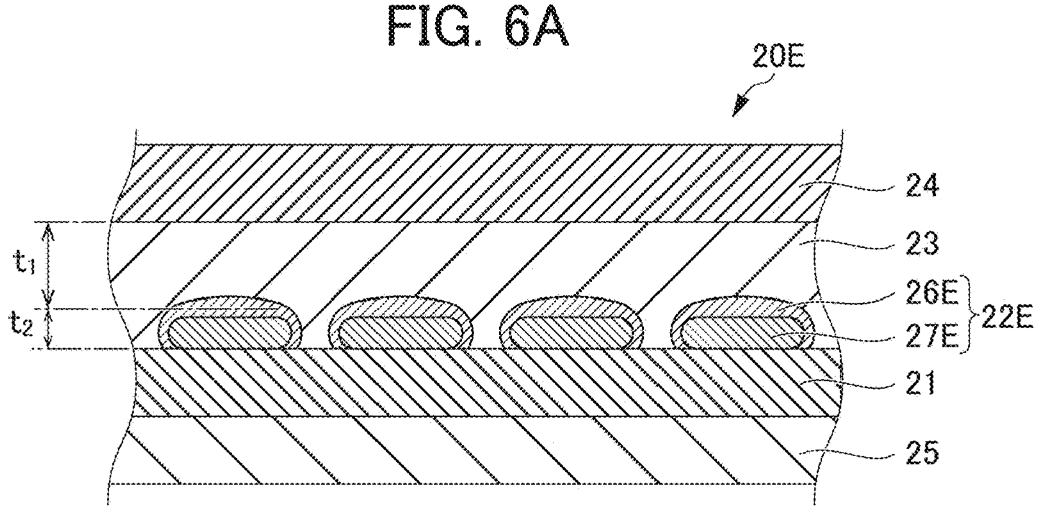
FIGS. 6A to 6C are each a partial cross-sectional view of a laminated structure of an external electrode when a Cu intervening portion is a composite intervening portion, where
Figure 6B:
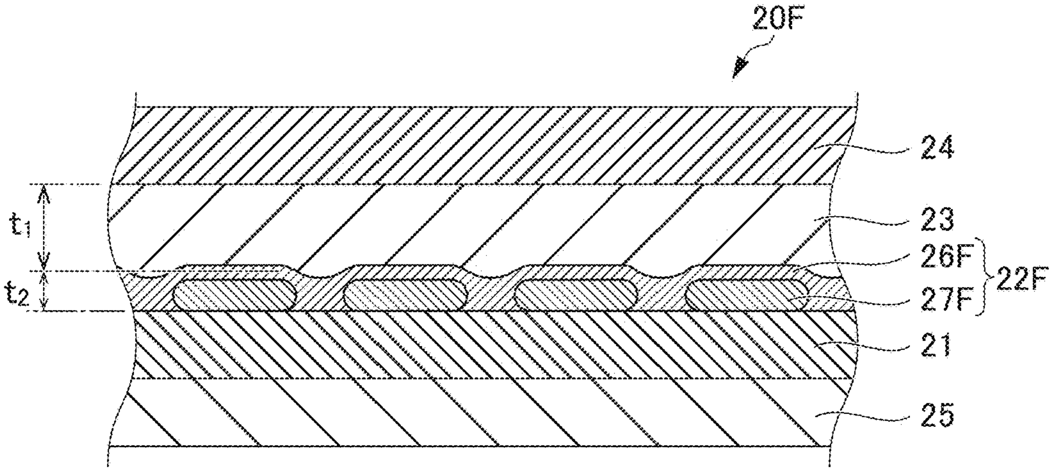
Figure 6C:
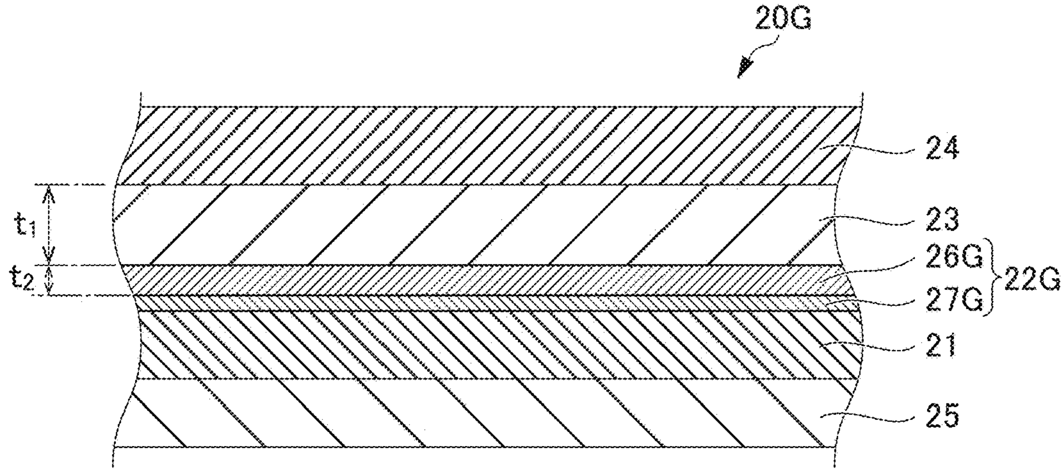

Further, the Cu intervening portion may be a composite intervening portion in which a Cu portion 27E including the Cu in an island shape and a $Cu_3Sn$ portion 26E including the $Cu_3Sn$ in an island shape are sequentially provided on the Ni plated layer 21. FIG. 6A shows such a composite intervening portion as the Cu intervening portion 22E. Further, the Cu intervening portion may be a composite intervening portion in which a Cu portion 27F including the Cu in an island shape and a $Cu_3Sn$ portion 26F including the $Cu_3Sn$ in a layered structure are sequentially provided on the Ni plated layer 21. FIG. 6B shows such a composite intervening portion as the Cu intervening portion 22F. Further, the Cu intervening portion may be a composite intervening portion in which a Cu portion 27G including the Cu in a layered structure and a $Cu_3Sn$ portion 26G including the $Cu_3Sn$ in a layered structure are sequentially provided on the Ni plated layer 21. FIG. 6C shows such a composite intervening portion as the Cu intervening portion 22G.

FIGS. 5A and 5B are each a partial cross-sectional view of a laminated structure of the external electrode when the Cu intervening portion is a single intervening portion. More specifically, FIG. 5A is a partial cross-sectional view of the external electrode when the Cu intervening portion in an island shape is provided by a single intervening portion including the $Cu_3Sn$ portion in an island shape. FIG. 5B is a partial cross-sectional view of the external electrode when the layer-shaped Cu intervening portion is provided by a single intervening portion including the layer-shaped $Cu_3Sn$ portion. FIGS. 6A to 6C are each a partial cross-sectional view of a laminated structure of the external electrode when a Cu intervening portion is a composite intervening portion. FIG. 6A is a partial cross-sectional view of an external electrode when the Cu intervening portion in an island shape is provided by a composite intervening portion including the Cu portion in an island shape and the $Cu_3Sn$ portion in an island shape. FIG. 6B is a partial cross-sectional view of the external electrode when the Cu intervening portion in a layered structure is provided by a composite intervening portion including the Cu portion in an island shape and the $Cu_3Sn$ portion in a layered structure. FIG. 6C is a partial cross-sectional view of the external electrode when the Cu intervening portion in a layered structure is provided by a composite intervening portion including the Cu portion in a layered structure and the $Cu_3Sn$ portion in a layered structure.

Here, the Cu portion of the composite intervening portion in the Cu intervening portion 22 may have a layered structure as shown in the Cu portion 27G of FIG. 6C. On the other hand, the Cu portion of the composite intervening portion in the Cu intervening portion 22 may have an island-shape in a dispersed manner as shown in the Cu portion 27E of FIG. 6A and the Cu portion 27F of FIG. 6B.

By providing such a Cu intervening portion 22, the generation of whiskers due to thermal shock (for example, thermal shock test under conditions of −55° C. to +125° C. and 30 cycles) can be effectively reduced or prevented. More specifically, by providing the Cu portions 27E to 27G in the Cu intervening portions 22E to 22G, the $Cu_3Sn$ portions 26 can be stably provided in the Cu intervening portions 22E to 22G, such that the formation of whiskers can be effectively reduced or prevented.

In particular, when the $Cu_3Sn$ portion 26 of the Cu intervening portion 22 is in a layered structure, the thickness $t_2$ of the $Cu_3Sn$ portion 26 is preferably about 120 nm or more and about 460 nm or less, and more preferably about 160 nm or more and about 460 nm or less, for example. By setting the thickness $t_2$ of the $Cu_3Sn$ portion 26 within this range, the $Cu_3Sn$ portion 26 having a higher density than the $Cu_6Sn_5$ portion 23 is generated and the compressive stress generated in the Sn plated layer 24 is reduced, such that the formation of whiskers can be reduced or prevented more effectively.

The $Cu_6Sn_5$ portion 23 is provided directly or indirectly on the Ni plated layer 21 via the Cu intervening portion 22. Since the electronic component 1 according to the present example embodiment includes the external electrode in which the $Cu_6Sn_5$ portion 23 is provided directly or indirectly on the Ni plated layer 21, the diffusion of the nickel atoms from the Ni plated layer 21 is prevented by the $Cu_6Sn_5$ portion 23 during the reflow step of joining the electronic component 1 to the circuit board by heating the solder on the circuit board, such that the heat resistance of the external electrode can be improved. As a result, it is possible to make mounting defects less likely to occur when the electronic component 1 is joined to the circuit board.

The $Cu_6Sn_5$ portion 23 has a layered structure and is on the Ni plated layer 21, or is dispersed on the Ni plated layer 21. Among them, the $Cu_6Sn_5$ portion 23 preferably has a layered structure. With such a configuration, the heat resistance of the external electrode 20 can be improved. Further, by increasing the smoothness of the surface of the $Cu_6Sn_5$ portion 23, even when the Sn plated layer 24 described later is provided, it is possible to prevent the occurrence of a stress gradient of compressive stress in the Sn plated layer 24 due to the growth of $Cu_6Sn_5$ along the grain boundary of Sn. As a result, the growth of whiskers can be reduced or prevented more effectively. The $Cu_6Sn_5$ portion 23 may include other components in addition to $Cu_6Sn_5$ as an additive component, and the form in which the additive component is present is not limited.

The thickness $t_1$ of the $Cu_6Sn_5$ portion 23 is not particularly limited, but can be, for example, about 300 nm or more and about 620 nm or less, and preferably about 400 nm or more and about 620 nm or less, for example. Here, the thickness $t_1$ of the $Cu_6Sn_5$ portion 23 may be larger than the thickness $t_2$ of the $Cu_3Sn$ portion 26 of the Cu intervening portion 22, or may be smaller than the thickness $t_2$ of the $Cu_3Sn$ portion 26.

The Sn plated layer 24 is on the $Cu_6Sn_5$ portion 23 and is on the outermost layer of the external electrode 20. In particular, by providing the Sn plated layer 24 on the outermost layer of the external electrode 20, when the electronic component 1 is mounted on the land of the circuit board, wettability with respect to solder used for mounting is improved, such that the electronic component 1 can be mounted on the circuit board more easily.

The Sn plated layer 24 covers the $Cu_6Sn_5$ portion 23. Here, it is preferable that the Sn plated layer 24 on the first external electrode 20*a* is on the surface of the $Cu_6Sn_5$ portion 23 along the first end surface 14*a*, and further reaches the surfaces of the $Cu_6Sn_5$ portion 23 along the first main surface 12*a*, the second main surface 12*b*, the first lateral surface 13*a*, and the second lateral surface 13*b*. Further, it is preferable that the Sn plated layer 24 on the second external electrode 20*b* is on the surface of the $Cu_6Sn_5$ portion 23 along the second end surface 14*b*, and further reaches the surfaces of the $Cu_6Sn_5$ portion 23 along the first main surface 12*a*, the second main surface 12*b*, the first lateral surface 13*a*, and the second lateral surface 13*b*.

The thickness $t_1$ of the $Cu_6Sn_5$ portion 23 and the thickness $t_2$ of the $Cu_3Sn$ portion 26 can be measured, for example, by performing element mapping for the cross section including the thickness direction of the external electrode 20 using an Analytical instrument: Scanning electron microscope (FE-SEM/EDX, FE-SEM: SU8230/EDX: 5060FQ, available from Hitachi High-Tech Corporation), under magnification: 10000 times. More specifically, the $Cu_6Sn_5$ portion 23 and the $Cu_3Sn$ portion 26 are distinguished by changing the color tone by element mapping, and when they can be distinguished, the cross-sectional areas of the portions occupied by the $Cu_6Sn_5$ portion 23 and the $Cu_3Sn$ portion 26 are calculated. Then, the average thickness of the $Cu_6Sn_5$ portion 23 can be calculated by dividing the cross-sectional area of the obtained $Cu_6Sn_5$ portion 23 by the width along the extending direction of the $Cu_6Sn_5$ portion 23 (when the $Cu_6Sn_5$ portion 23 has an island shape, the width of the void portion is excluded). Further, the average thickness of the $Cu_3Sn$ portion 26 can be calculated by dividing the cross-sectional area of the obtained $Cu_3Sn$ portion 26 by the width along the extending direction of the $Cu_3Sn$ portion 26 (when the $Cu_3Sn$ portion 26 has an island shape, the width of the void portion is excluded).

The thickness of the Sn plated layer 24 is not particularly limited, but is preferably about 1 μm or more and about 15 μm or less, for example.

The electronic component 1 of the present example embodiment preferably has a chip size ranging from 01 size to 32 size, for example. Among them, the 01 size has dimensions of 0.25 mm (length direction L)×0.125 mm (width direction W). The 02 size has dimensions of 0.4 mm (length direction L)×0.2 mm (width direction W). The 03 size has dimensions of 0.6 mm (length direction L)×0.3 mm (width direction W). The 15 size has dimensions of 1.0 mm (length direction L)×0.5 mm (width direction W). The 18 size has dimensions of 1.6 mm (length direction L)×0.8 mm (width direction W). The 31 size has dimensions of 3.2 mm (length direction L)×1.6 mm (width direction W). The 32 size has dimensions of 3.2 mm (length direction L)×2.5 mm (width direction W). Therefore, the dimension of the electronic component 1 along the length direction L is preferably about 0.25 mm or more and about 3.2 mm or less, for example. The dimension of the electronic component 1 along the width direction W is preferably about 0.125 mm or more and about 2.5 mm or less, for example. The dimension of the electronic component 1 along the thickness direction T is not particularly limited, but may be, for example, about 0.125 mm or more and about 2.5 mm or less.

(2) Method of Manufacturing Electronic Component

Hereinafter, an example of a method of manufacturing the electronic component 1 of the present example embodiment will be described by exemplifying a method of manufacturing the multilayer ceramic capacitor serving as the electronic component 1 shown in FIG. 1. The manufacturing method of the electronic component 1 of the present example embodiment is not limited as long as the above-mentioned requirements are satisfied.

First, a ceramic green sheet for forming the ceramic layer 15, an internal electrode conductive paste for forming the internal electrode layer 16, and a base electrode layer conductive paste for forming the base electrode layer 25 of the external electrode 20 are prepared. Here, the ceramic green sheet, the conductive paste for internal electrode, and the conductive paste for base electrode layer include organic binders and organic solvents, and known organic binders and organic solvents can be used. As the conductive paste for the base electrode layer, a paste including glass and other materials in addition to metal is used.

Then, for example, the internal electrode conductive paste is printed on the ceramic green sheet in a predetermined pattern to form an internal electrode pattern on the ceramic green sheet. The internal electrode conductive paste can be printed by a well-known method such as screen printing or gravure printing.

Next, one or a plurality of ceramic green sheets are laminated on the internal electrode pattern in the thickness direction T to form a layer serving as a base of the ceramic layer 15, and an internal electrode pattern is formed by printing an internal electrode conductive paste thereon. After repeating this process over a predetermined number of times, a plurality of ceramic green sheets are laminated in the thickness direction T to form a layer serving as a base of the outer layer portion 15*a*, thereby manufacturing a multilayer block. If desired, the multilayer block may be crimped along the thickness direction T by means of a hydrostatic press or the like.

Then, the multilayer block is cut to have a predetermined size, such that multilayer body chips are cut out. At this time, the ridge portions and the corner portions of the multilayer body chips may be rounded by barrel polishing or the like. Thereafter, the cut-out multilayer body chip is fired to form the base body 10. The firing temperature of the multilayer body chip depends on the ceramic material and the internal electrode conductive paste material, but is preferably about 900° C. or higher and about 1300° C. or lower, for example.

Next, the first external electrode 20*a* is formed on the first end surface 14*a* of the base body 10, and the second external electrode 20*b* is formed on the second end surface 14*b* of the base body 10.

First, the base electrode layer 25 is formed on the surface of the base body 10 including the first end surface 14*a* and the second end surface 14*b* by applying and firing an electrically conductive paste for the base electrode layer on the surface of the fired base body 10 including the first end surface 14*a* and the second end surface 14*b*. The firing temperature at the time of forming the base electrode layer 25 is preferably about 700° C. or more and about 900° C. or less, for example. The conductive paste for the base electrode layer may be fired before forming the Cu plated layer and the Sn plated layer 24 after forming the Ni plated layer 21. The conductive paste used for forming the base electrode layer 25 may include metallic particles including Cu or metallic particles including Ni. On the other hand, when the multilayer body chip is fired to obtain the base body 10, the base electrode layer 25 may be formed on the surface of the obtained base body 10 by firing this electrically conductive paste together with the multilayer body chip.

Next, the Ni plated layer 21, the Cu plated layer, and the Sn plated layer 24 are sequentially formed on the base electrode layer 25, and then heat treatment is performed, such that a portion or all of the Cu plated layer formed on the Ni plated layer 21 is changed to the $Cu_6Sn_5$ portion 23 or to the Cu intervening portion 22 with an island shape or a layered structure and the $Cu_6Sn_5$ portion 23. Here, the temperature and time of the heat treatment when a portion or all of the Cu plated layer is changed to the $Cu_6Sn_5$ portion 23 may be about 120° C. or more and about 170° C. or less, and may be about 30 minutes or more and about 5 hours or less, for example. Preferably, the temperature can be about 140° C. or more and about 160° C. or less and about 1 hour or more and about 2 hours or less, for example. At this time, the Cu plated layer can be changed to the $Cu_6Sn_5$ portion 23 through the $Cu_3Sn$ by adjusting the thicknesses and heating conditions of the Cu layer and the Sn layer, but the Cu intervening portion 22 having the $Cu_3Sn$ portion 26 and the Cu portion 27 may be formed in addition to the $Cu_6Sn_5$ portion 23.

Here, the formation of the Ni plated layer 21, the Cu plated layer, and the Sn plated layer 24 is not particularly limited, and a well-known method can be used.

In addition, an unreacted portion of the Cu plated layer becomes a Cu portion 27 with an island shape or a layered structure. Further, the unreacted portion of the Sn layer becomes the Sn plated layer 24.

By performing as described above, the multilayer ceramic capacitor serving as the electronic component 1 is manufactured.

(3) Mounting Method and Mounting Structure of Electronic Component

Figure 7A:
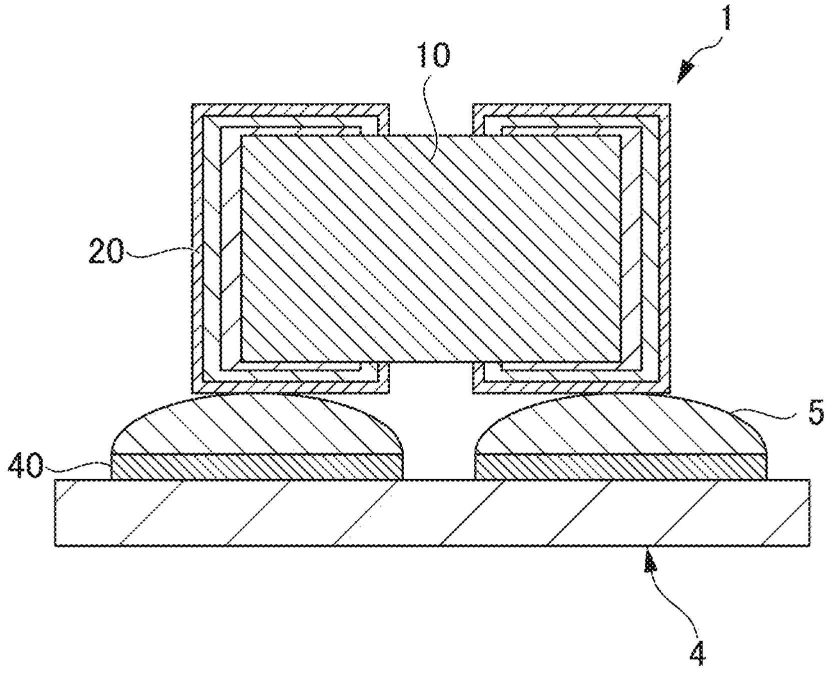
Figure 7B:
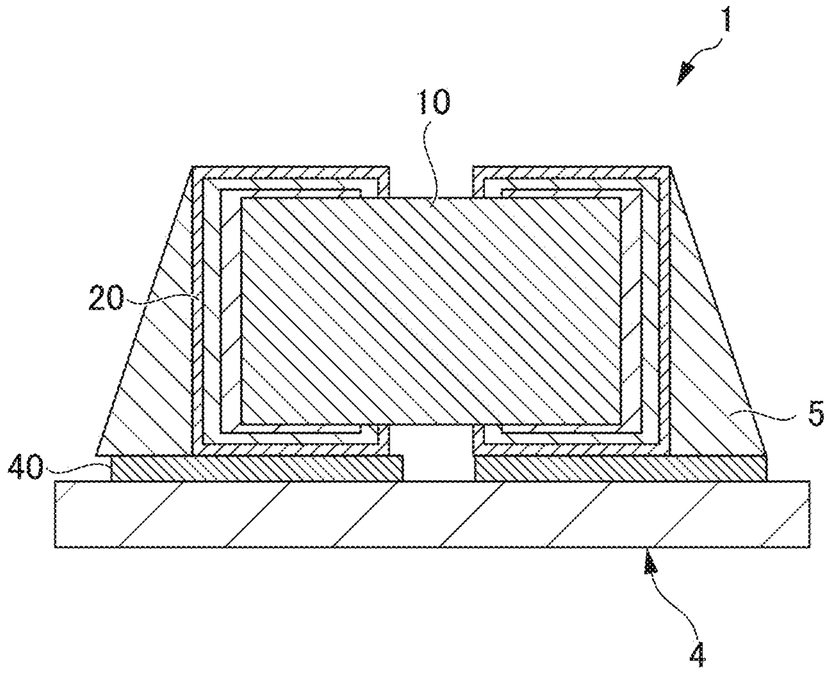

FIGS. 7A and 7B are each a schematic cross-sectional view showing a method of mounting each of electronic components of the present example embodiment. FIG. 7A is a schematic cross-sectional view showing a state before reflow. FIG. 7B is a schematic cross-sectional view showing a state after reflow in which the electronic component is mounted on the circuit board.

The electronic component 1 of the present example embodiment can be mounted on the land 40 of the circuit board 4 by a well-known reflow process in which the solder 5 is melted by heating to join to the circuit board.

Further, in the electronic component 1 of the present example embodiment, as described above, it is preferable to perform heat treatment in which the Cu plated layer is changed to the $Cu_6Sn_5$ portion 23 or the Cu intervening portion 22 in a state where the base electrode layer 25, the Ni plated layer 21, the Cu plated layer, and the Sn plated layer 24 are sequentially formed on the surface of the base body 10 including the first end surface 14*a* and the second end surface 14*b* in the land 40 of the circuit board 4, and the solder is provided between the Sn plated layer 24 and the land 40. As a result, the solder 5 on the surface of the land 40 is reflowed by the heat treatment, and by the heat at this time, a resulting product from the sequential formation of the base electrode layer 25, the Ni plated layer 21, the Cu plated layer, and the Sn plated layer 24 can be changed to the external electrode 20 in a desired configuration, such that the resulting electronic component 1 can be mounted on the land 40 of the circuit board 4, while the external electrode 20 has the desired characteristics when in use.

By adopting such a mounting method to the electronic component 1 of the present example embodiment, it is possible to provide a mounting structure in which the external electrode 20 having at least the Ni plated layer 21 and the $Cu_6Sn_5$ portion 23 provided directly on the Ni plated layer 21 or indirectly on the Ni plated layer 21 via the Cu intervening portion with an island shape or a layered structure is joined to the land 40 of the circuit board 4 by the solder 5.

EXAMPLES

The present invention will be described in more detail using the following examples of the present invention. However, the present invention is not limited to the following examples of the present invention.

For each of the electronic components 1, a multilayer ceramic capacitor was fabricated in accordance with the above-described manufacturing method, and the printed circuit board was reflow-mounted using Sn—Ag—Cu (SAC) solder. Here, the thickness and heat treatment condition of the Cu plated layer formed on the base electrode layer 25 were varied, and the shape of the Cu portion 27 was evaluated for each of the obtained electronic components 1, and the shape and thickness $t_2$ of the $Cu_3Sn$ portion 26 (only in the case of a layered structure) and the thickness $t_1$ of the $Cu_6Sn_5$ portion 23 were measured. Each of the obtained electronic components 1 was evaluated for heat resistance and presence or absence of whiskers.

The specifications of the examples of the multilayer ceramic capacitors each serving as the electronic component 1 are as follows.

Dimensions (design value): 3.2 mm (length direction L)×2.5 mm (width direction W)×2.5 mm (thickness direction T)

Material of ceramic layer 15: $BaTiO_3$

Capacitance: 10 μF

Rated voltage: 25 V

Material of internal electrode layer 16: Ni

Structure of external electrode

Base electrode layer 25

Material of base electrode layer 25: Electrically conductive metal (Cu)

Thickness of base electrode layer 25: 65 μm

Thickness of Ni plated layer 21: 1.5 μm

Thickness of Cu plated layer (before heat treatment): Table 1

Thickness of Sn plated layer (before heat treatment): 5.0 μm. Presence and shape of Cu portion 27 (after heat treatment): Table 1

Thickness $t_2$ (after heat treatment) of $Cu_3Sn$ portion 26 in a layered structure: Table 1

Thickness $t_1$ (after heat treatment) of $Cu_6Sn_5$ portion 23 in a layered structure: Table 1

On the other hand, the multilayer ceramic capacitor of Comparative Example 1 was configured in the same manner as each of the multilayer ceramic capacitors of Inventive Example 1 except that the Sn plated layer 24 was provided on the surface of the Ni plated layer 21 provided on the base electrode layer 25 on the surface of the base body 10 without providing the Cu plated layer. Here, the multilayer ceramic capacitor obtained in Comparative Example 1 did not include the $Cu_6Sn_5$ portion 23 and did not have the $Cu_3Sn$ portion 26 and the Cu portion 27.

The heat resistance of each of the electronic components 1 was evaluated under the following conditions. Each of the electronic components 1 obtained in Inventive Examples 1 to 10 of the present invention was subjected to a heat resistance test in which each of the electronic components 1 was left in a thermostatic chamber at 175° C. for 500 hours, and then the cross sections of a central portion of the external electrodes 20*a* and 20*b* along the thickness direction T and the width direction W were observed by a scanning electron microscope (FE-SEM/EDX) (FE-SEM: SU8230/EDX: 5060FQ available from Hitachi Hi-Tech Corporation). As a result, the presence of the Ni plated layer 21 was confirmed in each of the external electrodes 20*a* and 20*b*.

Here, when the Ni plated layer 21 is changed to a compound of Ni—Sn—Cu by the heat resistance test and the Ni plated layer 21 covering the base electrode layer 25 is lost, the coverage ratio of the Ni plated layer 21 with respect to the base electrode layer 25 decreases. In the portion of the base electrode layer 25 that is not covered with the Ni plated layer 21, the base electrode layer 25 and the Cu intervening portion 22 or the $Cu_6Sn_5$ portion 23 are brought into direct contact with each other, and the base electrode layer 25 and they may react with each other, such that heat resistance tends to decline. In view of the above, for each of the portions before and after the heat resistance test, the length was determined of the portion of the external electrode 20*a* at which the base electrode layer 25 and the Ni plated layer 21 are in contact with each other, which is shown in the cross section at the central portion along the thickness direction T and the width direction W. At this time, when the ratio of the area of the Ni plated layer 21 coated on the base electrode layer 25 after the heat resistance test (hereinafter, referred to as "the coverage area of the Ni plated layer 21 after the heat resistance test") to the area of the Ni plated layer 21 coated on the base electrode layer 25 before the heat resistance test (hereinafter, referred to as "the coverage area of the Ni plated layer 21 before the heat resistance test") was greater than about 95%, the ratio was evaluated as very good (indicated by bullseye symbol (⊙)). Further, when the ratio of the coverage area of the Ni plated layer 21 after the heat resistance test to the coverage area of the Ni plated layer 21 before the heat resistance test was in the range of more than about 80% and less than about 95%, the ratio was evaluated as good (indicated by circle symbol (○)). In addition, when the ratio of the coverage area of the Ni plated layer 21 after the heat resistance test to the coverage area of the Ni plated layer 21 before the heat resistance test was less than about 80%, the ratio was evaluated as poor (indicated by cross symbol (x)). The results are shown in Table 1.

In the evaluation of the presence or absence of whisker formation on each of the electronic components 1, each of the electronic components 1 obtained from Inventive Examples 1 to 10 of the present invention was left in a thermostatic chamber at 30° C. for 4000 hours, and the presence or absence of whisker was examined by observing the central region except for the peripheral region of 5 mm from the edge of the plated layer with a magnification ratio of 1000 times using a SEM, cases where no whiskers were observed were evaluated as very good (indicated by bullseye symbol (⊙)), cases where the maximum value of the whisker size was less than 20 μm were evaluated as good (indicated by circle symbol (○)), cases of a whisker having a maximum whisker size of 20 μm or more and less than 40 μm were evaluated as fair (indicated by triangle symbol (Δ)), and cases of a whisker having a maximum whisker size of 40 μm or more were evaluated as poor (indicated by cross symbol (x)).

TABLE 1

| | External electrode | | | | Electronic Component | |
|---|---|---|---|---|---|---|
| | Before heat treatment | After heat treatment | | | | |
| | Thickness of Cu plated layer [μm] | Presence or absence and shape of Cu portion | Thickness $t_2$ [nm] of $Cu_3Sn$ portion | Thickness $t_1$ [nm] of $Cu_6Sn_5$ portion | Evaluation of heat resistance | Evaluation of whisker formation |
| Inventive Example 1 | 0.1 | None | None | 200 to 300 | ○ | Δ |
| Inventive Example 2 | 0.2 | None | Island shape | 350 | ○ | Δ |
| Inventive Example 3 | 0.3 | None | 120 | 300 | ○ | ○ |
| Inventive Example 4 | 0.4 | None | 150 | 350 | ○ | ○ |
| Inventive Example 5 | 0.5 | Island shape | 300 | 350 | ○ | ○ |
| Inventive Example 6 | 0.6 | Island shape | 310 | 370 | ○ | ○ |
| Inventive Example 7 | 0.6 | Island shape | 350 | 420 | ⊙ | ○ |
| Inventive Example 8 | 0.8 | Layered structure | 160 | 400 | ⊙ | ⊙ |
| Inventive Example 9 | 0.8 | Layered structure | 300 | 350 | ○ | ⊙ |
| Inventive Example 10 | 0.8 | Layered structure | 410 | 620 | ⊙ | ⊙ |
| Comparative Example 1 | None | None | None | **None** | **X** | **X** |

Note:
The underlined bold letters or symbols shown in the table indicate outside the scope of the present invention.

From the results of Table 1, each of the electronic components 1 of Inventive Examples 1 to 10 of the present invention included the external electrode 20 including the Ni plated layer 21 and the $Cu_6Sn_5$ portion 23 provided directly on the Ni plated layer 21 or indirectly on the Ni plated layer 21 via the Cu intervening portion 22 with an island shape or a layered structure, and each of the results of the heat resistance was evaluated as "O".

Accordingly, each of the electronic components 1 of Inventive Examples 1 to 10 of the present invention included the external electrode 20 having sufficient heat resistance.

On the other hand, in the electronic component of Comparative Example 1 in which the $Cu_6Sn_5$ portion 23 was not provided in the external electrode 20, the ratio of the coverage area of the Ni plated layer 21 after the heat resistance test to the coverage area of the Ni plated layer 21 before the heat resistance test was less than about 80%, and the heat resistance did not reach an acceptable level.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:

a base body including internal electrodes embedded therein, first and second main surfaces opposed to each other in a thickness direction, first and second lateral surfaces opposed to each other in a width direction orthogonal or substantially orthogonal to the thickness direction, and first and second end surfaces opposed to each other in a length direction orthogonal or substantially orthogonal to both the thickness direction and the width direction; and a pair of external electrodes respectively on the first and second end surfaces of the base body and respectively connected to the internal electrodes; wherein each of the pair of external electrodes includes at least:

a Ni plated layer; and a $Cu_6Sn_5$ portion including a first portion provided directly on the Ni plated layer and a second portion provided indirectly on the Ni plated layer via a Cu intervening portion with an island shape.

2. The electronic component according to claim 1, wherein the Cu intervening portion is a single intervening portion including $Cu_3Sn$ with an island shape or a layered structure on the Ni plated layer, or a composite intervening portion in which a Cu portion including Cu with an island shape or a layered structure and a $Cu_3Sn$ portion including $Cu_3Sn$ in the island-shape or the layered structure are sequentially provided on the Ni plated layer.

3. The electronic component according to claim 2, wherein the $Cu_6Sn_5$ portion is thicker than the $Cu_3Sn$ portion.

4. The electronic component according to claim 2, wherein the $Cu_3Sn$ portion has a thickness of about 120 nm or more and about 460 nm or less.

5. The electronic component according to claim 2, wherein the Cu portion of the composite intervening portion includes a layered structure.

6. The electronic component according to claim 2, wherein the Cu portion of the composite intervening portion includes an island-shape in a dispersed manner.

7. The electronic component according to claim 2, wherein the $Cu_3Sn$ portion has a thickness of about 160 nm or more and about 460 nm or less.

8. The electronic component according to claim 1, wherein the $Cu_6Sn_5$ portion has a thickness of about 300 nm or more and about 620 nm or less.

9. The electronic component according to claim 1, wherein the electronic component is a multilayer ceramic capacitor, a multilayer LC filter, a multilayer ceramic inductor or a multilayer ceramic thermistor.

10. The electronic component according to claim 1, wherein the $Cu_6Sn_5$ portion has a thickness of about 400 nm or more and about 620 nm or less.

11. A mounting structure comprising:

a circuit board including a land; and the electronic component according to claim 1 mounted on the land of the circuit board; wherein the pair of external electrodes including at least the Ni plated layer and the $Cu_6Sn_5$ portion is joined to the land of the circuit board by a solder.

12. The mounting structure according to claim 11, wherein the Cu intervening portion is a single intervening portion including $Cu_3Sn$ with an island shape or a layered structure on the Ni plated layer, or a composite intervening portion in which a Cu portion including Cu with an island shape or a layered structure and a $Cu_3Sn$ portion including $Cu_3Sn$ in the island-shape or the layered structure are sequentially provided on the Ni plated layer.

13. The mounting structure according to claim 12, wherein the $Cu_6Sn_5$ portion is thicker than the $Cu_3Sn$ portion.

14. The mounting structure according to claim 12, wherein the $Cu_3Sn$ portion has a thickness of about 120 nm or more and about 460 nm or less.

15. The mounting structure according to claim 12, wherein the Cu portion of the composite intervening portion includes a layered structure.

16. The mounting structure according to claim 12, wherein the Cu portion of the composite intervening portion includes an island-shape in a dispersed manner.

17. The mounting structure according to claim 11, wherein the $Cu_6Sn_5$ portion has a thickness of about 300 nm or more and about 620 nm or less.

* * * * *